United States Patent [19]
Skippon et al.

[11] 3,830,383
[45] Aug. 20, 1974

[54] UNLOADER

[76] Inventors: Robert T. Skippon, R.R. No. 1, Guelph, Ontario; Charles M. Robinson, R.R. No. 1; David C. Tinney, c/o 166 Daniel St., both of Erin, Ontario; Simon Q. M. Koopman, R.R. No. 1, Erin, Ontario, all of Canada

[22] Filed: Dec. 4, 1972

[21] Appl. No.: 311,946

[52] U.S. Cl............................ 214/17 DB, 198/139
[51] Int. Cl............................................. B65g 65/38
[58] Field of Search..... 214/17 DA, 17 DB; 302/56; 198/139

[56] References Cited
UNITED STATES PATENTS
| 978,908 | 12/1910 | Leary | 198/139 X |
| 3,528,568 | 9/1970 | Romberg | 214/17 DA |

Primary Examiner—Robert G. Sheridan

[57] ABSTRACT

A bulk material unloader, such as a silo unloader, having a material gathering endless chain. The length of the material engaging portion of the chain can be changed, whereby the unloader is particularly suitable in unloading ensilage from trough-shaped horizontal silos.

13 Claims, 6 Drawing Figures

UNLOADER

This invention relates to bulk material unloaders and in particular to unloaders used in horizontal silos.

The term "horizontal silo", as opposed to a "vertical" or "tower" silo, is to be understood to mean an elongated container, usually concrete, open on top and built in the ground. This type of silo is further characterised in that its inner side walls converge downwardly and inwardly rather than being vertical. Horizontal silos are frequently used in farming for the storage of grain fodder etc.

It is common in vertical silos to remove ensilage material from the face of the tightly packed mass by means of mechanical unloaders of the type in which an endless gathering chain has a gathering run, i.e., a portion of the chain path which scrapes the ensilage toward the centre of the silo. The ensilage is then removed from the silo by subsequent transporting means such as a blower with a duct associated with same. In view of the fact that the cross-section of a horizontal silo is gradually narrowing, it has not been possible to unload same with the known unloaders, in which the gathering run is of a constant length.

It is an object of the present invention to provide an unloader for bulk material, such as green fodder, etc. wherein the length of the gathering run is adjustable, whereby the unloader can be used in horizontal silos.

The bulk material unloader according to the present invention has a gathering chain adapted to train about a chain path. A portion of the chain part constitutes a gathering run of same and the remaining portion of the path is a slack portion. The chain is further adapted to be moved in a direction substantially across the gathering run to bring the chain into operative engagement with said material. The unloader is provided with means for selectively changing the length of said gathering run.

An embodiment of the present invention, as adapted for use in horizontal silos will further be described with reference to the enclosed simplified drawings, in which.

Figure 4:
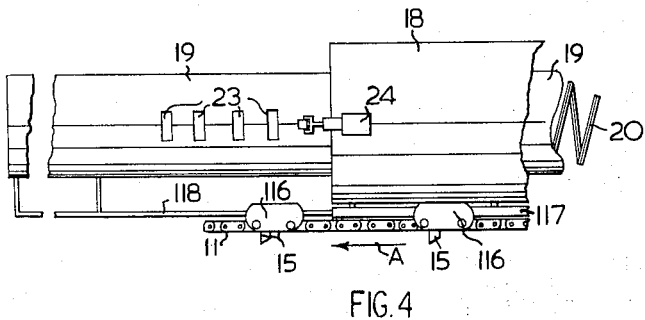
FIG. 4 is a detail 4—4 of FIG. 2.

The unloader is provided with a gathering chain 10. The chain 10 is adapted to train about sprocket wheels 11, 12 and a roller 13, in the direction A. The chain 10 thus defines a chain path which comprises a gathering portion i.e. the portion between the two sprocket wheels, 11, 12, and a slack portion extending from the sprocket wheel 12 over the roller 13 to the sprocket wheel 11. The design of the chain per se does not constitute an invention and therefore need not be described in detail. Fixed to the chain 10 are gathering members such as teeth 15 (FIG. 4), buckets (not shown), etc. The teeth 15 may be fixed to chain links 116 provided with connection openings arranged to one side of the link 116, the opposite side of the link 116 being adapted to slide on slide bars 117, 118. The tubular slide bar 117 is fixed to a first tubular member 18, while the slide bar 118 is fixed to a second tubular member 19. One end of the bar 118 is inserted in the tubular slide bar 117 for a telescopic movement therein.

Figure 1:
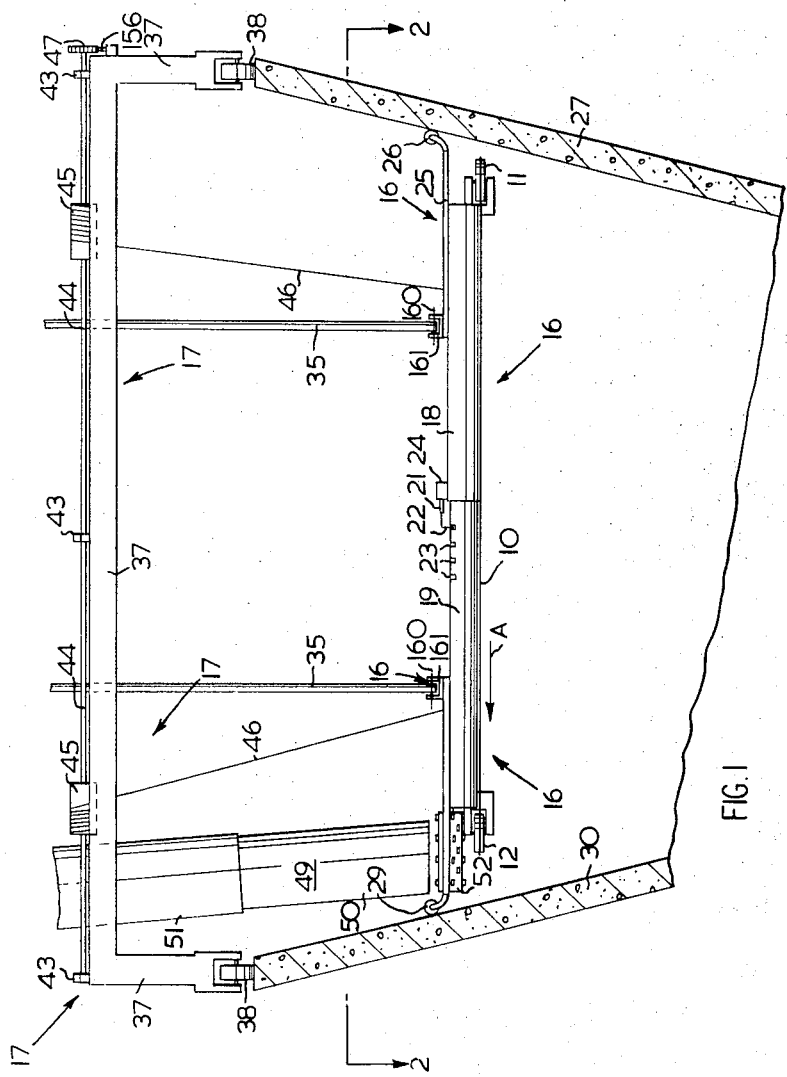
FIG. 1 is a side elevation of a silo unloader, showing the silo side walls in section.

The sprocket wheels 11, 12 and the roller 13 are mounted in an assembly which will generally be referred to as carrier means, or carrier 16 (FIG. 1). The carrier 16 is connected to an overhead carriage 17.

The assembly of the carrier 16 will now be described in detail. The sprocket 11 is mounted at the end of the first tubular member 18. Similarly, the other sprocket 12 is mounted at the end of the second tubular member 19. The second tubular member 19 telescopes into the first tubular member 18. Fixed to the second tubular member 19 is one end of a coil spring 20, the opposite end of which is connected to the first tubular member 18. The spring 20 is designed to create a slight axial pressure forcing the telescopic assembly of the tubular members 18, 19 to expand. Thus, the carrier means 16 is extensible, or spring urged to extend in length, in order to increase the distance between the sprocket wheels 11, 12, thereby increasing the length of the gathering run.

The tubular members 18, 19 are further provided with locking means adapted to fix the assembly of the tubular members 18, 19 in a predetermined length. Many known locking devices can be used in this place. The device shown in FIGS. 1 and 4, consists of a lever 21 the free end of which is provided with a nose 22. The nose 22 is adapted to engage one of the locking openings 23 in the tubular member 19. The opposite end of the lever 21 is suitably supported in a box 24 fixed to the tubular member 18. The box 24 may include a remotely operated electromagnet (not shown) or another suitable device for controlling the movement of the lever 21 in order to bring the nose 22 into or out of the engagement with one of the holes. The use of the electromagnet or similar means is of advantage when a remote control of the locking or releasing operation is desired. It will be appreciated that the telescopic mutual movement between the tubular member 18, 19 is prevented after engaging the nose 22 with one of the holes 23. In other words, the locking device locks the sprocket wheels 11, 12 at a predetermined distance from each other by causing the carrier 16 to be rigid until subsequent release of said locking device.

Figure 2:
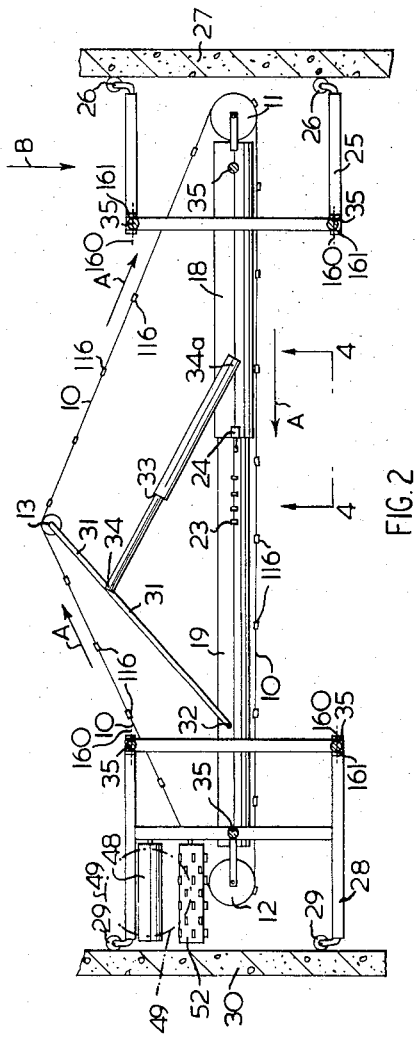
FIG. 2 is a top view 2—2 of FIG. 1.

Fixed to the first tubular member is a frame 25 carrying casters 26. As best seen in FIG. 2, the casters 26 reach beyond the outermost surface of the sprocket wheel 11. The casters 26 can rest against a side wall 27 of the silo thereby preventing undesired contact between the chain 10 and the wall 27. The second tubular member 19 is provided with a similar frame 28. The frame 28 carries casters 29 which can rest against a side wall 30. As seen in FIG. 1, the side walls 27, 30 of the silo converge in downward direction. Consequently, when the carrier 16 is lowered with the locking means released, the side walls 27, 30 create a wedging effect which is transferred through the casters 26, 29 to their respective frames 25, 28 and thereby to the tubular members 18, 19. As a result, the second tubular member 19 telescopes into the first tubular member 18 overcoming the slight axial pressure of the spring 20. On the other hand, when the carrier 16 is lifted, the assembly of the tubular members 18, 19 will expand or extend by the effect of the spring 20 to keep the casters 26, 29 in contact with their respective side walls 27, 30.

Hence, the above arrangement provides means for selectively changing the distance between the sprocket wheels 11, 12. The arrangement can also be referred to as means for selectively changing the length of the gathering run.

It is to be noted that the casters 26, 29 constitute one example of silo wall contacting means and that they can be substituted by numerous other members known per se, e.g. by sensing levers etc. The casters 26, 29 can therefore also be referred to in general as one embodiment of silo wall contacting means, arranged in proximity to said sprocket wheels 11, 12 and secured to the ends of said tubular members 18, 19, each of said contacting means being adapted to rest against its adjacent walls 27, 30 and to maintain a distance between said walls 27, 30 and the chain 10 passing over said sprocket wheels 11, 12.

The tension of the gathering chain 10 has to be maintained at a substantially uniform value. This is accomplished by mounting the roller 13 at one end of a first arm 31. The opposite end of the first arm 31 is pivotally connected to the tubular member 19 at 32. Pivotally mounted to the first arm 31 at 34 is one end of a second arm 33, the opposite end of the arm 33 being pivotally connected to the first tubular member 18 at 34a. When the tubular member assembly is being contracted, the pivot points 34a, 32 are being brought closer to each other, the second arm 33 thereby forcing the first arm 31 to turn anticlockwise (as viewed in FIG. 2). This movement brings the roller 13 into a more remote position from the axis of the tubular members 18, 19 to maintain the tension of the slack portion of the chain 11. In more general terms, said means for selectively changing the length of said gathering run are adapted to simultaneously change the length of each of the straight portions of the path of the chain 10.

The second arm 33 may be of the type of a telescopic assembly with a spring inside, adapted to urge the second arm 33 to expand and thereby to create some resiliency of the tension in the slack portion of the chain 10, to reduce the risk of damage to the chain 10 during its operation.

The carriage 17 is connected to the carrier means 16 by means of four rods 35. The lower ends of the rods are swingably connected to the frames 25, 28 by means of pins 160 inserted in brackets 161, fixed to the frames 25, 28.

The upper portion of each of the rods 35 is substantially square in cross-section, and is slideable in a channel 152 provided in a cradle 53. The cradle is swingably supported by a cross member 36 of the frame 37 of the carriage 17. The connection of the upper portion of the rods 35 with the cradle 53 will be described in detail later.

The frame 37 of the carriage 17 is provided with four wheels 38, the front pair of which is shown in FIG. 1. The wheels can run along the silo on the top edges of the side walls 27, 30. The carriage 17 is thus movable along the silo, i.e. in a horizontal direction substantially across the direction of the gathering run of the chain. Inasmuch as carrier means 16 is connected to the carriage 17, it can be generalized, that the chain 10 is adapted to be moved in a direction substantially across said gathering run, i.e. in the direction B (FIGS. 2, 5) or in an opposite direction to that of B. It will be appreciated that the direction B is that of bringing the gathering run of the chain 10 into operative engagement with the material to be unloaded. It is further apparent from FIG. 5, that the direction B is substantially horizontal in the example of the embodiment shown in the drawings.

Figure 5:
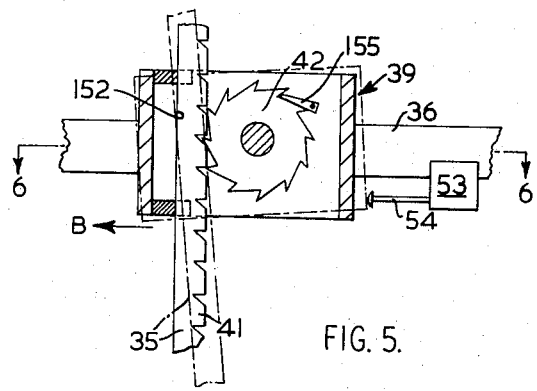
FIG. 5 is a detail showing an example of mounting of rods connecting a lower carrier means with an upper carriage for moving the unloader along the silo.
Figure 6:
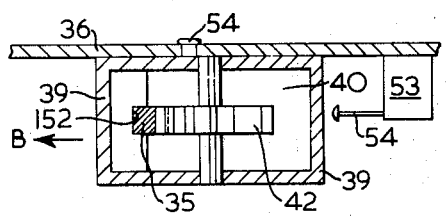
FIG. 6 is a section 6—6 of FIG. 5.

An example of the connection of the upper portion of the rods 35 to the carriage will now be described. The cross member 36 of the frame 37 of the carriage 16 swingably supports the cradle 53. One such cradle 53 is shown in FIGS. 5 and 6. The cradle can swing about a pivot 54 (FIG. 6), connecting the cradle to the frame 37. The inside portion of the cradle 53 defines the channel 152 adapted to slideably receive the rod 35.

The rod 35 is provided with a series of teeth 41, adapted to engage the teeth of a rachet wheel 42. The pawl 155 of the ratchet wheel 42 is adapted to prevent the ratchet wheel 42 from turning in clockwise direction (FIG. 5), but allows an anti-clockwise rotation of same. As a result, the bar 35 can slide through the channel 152 downwardly, but not upwardly, unless the pawl 155 is released, e.g. by remotely controlled means (not shown).

Fixed to the frame 37 of the carriage 17 are bearings housing 43 of a shaft 44 to which are keyed or otherwise fixed winding drums 45, upon each of which is wound a cable 46. The lower end of each of the cables 46 is attached to the carrier 16, namely to the tubular members 18, 19. It will be appreciated that when the shaft 44 is rotated by a suitable drive device generally indicated as a gear 47, the cables 46 can be wound upon or unwound from the drums 45 thereby lifting or lowering the carrier 16, with the above pawl 155 released.

The gear 47 may be provided with suitable locking device e.g. a radially shiftable locking pin 156 (FIG. 1), which can be inserted into mesh with the teeth of the gear 47, and selectively released from same, e.g. by a remotely controlled device (not shown).

When it is necessary to lift the carrier, the pawl 155 is to be released, the locking pin 156 disengaged from the gear 47, and the drive of the drums 45 actuated to wind the cables 46 upon them. When a predetermined vertical position of the carrier is reached, the pawl 155 is re-engaged with the ratchet wheel 42 and the locking pin 156 is brought into mesh with the gear 47. Thus, the carrier 16 is now locked in a selected vertical distance from the carriage 17.

When lowering the carrier 16 the pin 156 is disengaged from the gear 47 thereby making it possible to unwind the cables 46 from the drums 45. Due to the above mentioned design of the ratchet mechanism in the cradle 39, it is not necessary to release the pawl 155 when lowering the carrier 16. Finally, the drive of the drums 45 is actuated to unwind the cables 46 from the drums 45.

In general terms, the cables 46 winding drums 45 and the parts associated therewith, constitute one example of means for selectively changing the position of the gathering run in vertical direction. The locking pin 156 and the pawl 155, along with their above mentioned counterparts, can generally be referred to as one example of locking means for locking said gathering run in a selected upright position.

As seen in FIG. 5, at least one of the rods 35 is provided with a swing sensing means which is shown as a switch box 53 with an actuator 54, the free end of which is arranged in proximity to the rod 35. The switch box 53 is operatively connected to stop the drive of the wheels of the carriage 17 when actuated. The outer surface of the cradle 39 pushes the actuator 54 inside the switch box to actuate a switch, when the rod 35 reaches a predetermined angular deviation shown in broken lines in FIG. 5. It will be appreciated that the angular deviation of the rod 35 is of the type wherein the rod 35 slopes downwardly and backwardly with regard to the direction B indicating the forward movement of the carriage 17.

The unloader is further provided with means for transporting the silage from one end of the gathering run outwardly from the silo. This device is shown in FIGS. 1 and 2. Generally, it consists of a blower 48, carried by the frame 28. The blower 48 is located at the lower end of a discharge tubular duct 49. As seen in FIG. 1, the duct is telescopic and may consist of a lower tube 50 and an upper tube 51. The lower tube 50 may be attached to the carrier 16 by any known suitable means (not shown in the drawings) and the upper tube can be similarly attached to the carriage 17. Thus, the duct 49 can be lengthened or shortened as the carrier 16 is lowered or raised.

Mounted in the frame 28 (FIG. 2) is a rotary disintegrator 52. The disintegrator has the form of a roller, the surface of which is provided with disintegrating teeth. As seen in FIG. 2, the disintegrator 52 is arranged in proximity to the blower 48 and in front of same.

Figure 3:
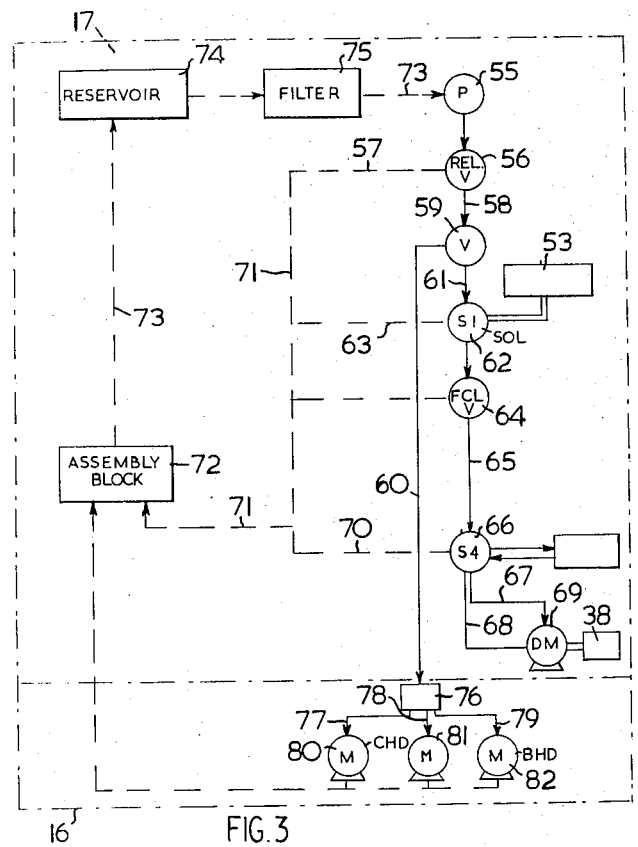
FIG. 3 is a block diagram showing the drive of the unloader.

The unloader is provided with a hydraulic drive. It consists, essentially, of the elements shown in FIG. 3. The drive system is provided with a pump 55. The outlet of the pump 55 is connected to a relief valve 56, having a relief conduit 57 and a pressure conduit 58. The pressure conduit is connected to the inlet of a divider valve 56, having two outlet conduits 60, 61. The conduit 60 delivers pressure fluid to the elements mounted in the carrier 16, while the outlet 61 delivers pressure fluid to the carriage 17.

Connected to the conduit 61 is a solenoid control valve 62, the control circuit of which is connected to the switch in the switch box 53 mentioned above. The valve 62 has a relief outlet connected to a return conduit 63, and a working pressure outlet connected to a flow control valve 64, the working pressure outlet 65 of which is connected to a flow reversing valve 66. The valve 66 has two working pressure conduits 67, 68, both of which are connected to a motor 69, and a relief outlet conduit 70. The motor 69 is adapted to drive at least one of the wheels 38 of the carriage 17. The relief conduits 57, 63 and 70 and a relief branch of the valve 64, terminate in a return header 71, connected to an input of an assembly block 72, the outlet of which is provided with a fluid return system including a piping 73, reservoir 74, and a filter 75. The outlet piping 73 of the filter 75 terminates at the intake of the pump 55.

The conduit 60 of the divider valve 59 terminates in an inlet of a divider 76, having three outlets connected to the conduits 77, 78 and 79 for delivering the working pressure fluid to hydraulic motors 80, 81, 82 respectively. The motor 80 is used in driving the left hand side sprocket 12 as viewed in FIG. 2, the motor 81 drives the disintegrator 52, and the motor 82 is operatively connected to drive the blower 48.

Apparently, numerous modifications of the drive system are possible without departing from the scope of the present invention.

The operation of the unloader is as follows. The carriage 17 rests with its wheels 38 on the upper edge of the side walls 27, 30 of the silo, at the front end of the silo, ready to be moved in the direction B (FIG. 2). The carriage 17 suspends the carrier means 16, by means of the cables 46. The carrier 16 is lowered to the level of silage packed in the silo by firstly disengaging the locking pin 156 from the gear 47 and then driving the gear 47 to unwind the cables 46 from their respective drums 45. The rods 35 slide downward in their respective channels 152 in the cradles 39, thereby causing the ratchet wheel 42 to turn anti-clockwise (FIG. 5). It is apparent from the foregoing, that the duct 49 is being expanded in length as the carrier means 16 moves downwardly. The nose 22 of the lever 21 has to be disengaged from the opening 23, to make it possible for the tubular members 18, 19 to contract in length as the carrier 16 is moved downwardly. As it has already been disclosed, the nose 22 has to be re-engaged with the appropriate opening 23, when a desired level of the carrier 16 is reached. At the same time, the locking pin 56 is brought into mesh with the gear 47 thereby locking the gear 47.

Then the pump 55 is started with the relief valve 56 in a closed position in which the hydraulic fluid flows through the conduit 58 to the divider valve 59 which divides the flow into two portions flowing through the conduits 60 and 61.

The flow through the conduit 60 (the main portion of which is constituted by a hose) is delivered to the divider 76, distributing the fluid to the motors 80, 81, 82, thereby causing the sprocket wheel 12, the disintegrator 52 and the blower 48 to rotate. The sprocket wheel 12 drives the chain 10 to train in the direction A (FIG. 1).

The flow through the conduit 61 is delivered to the solenoid control valve 62. If the valve 62 is in a "stop" position the flow is directed to the return conduit 63. If the valve 62 in a "go" position the flow is directed to the flow control valve 64 and via the conduit 65 to the flow reversing valve 66 and therefrom through the conduit 67 to the drive motor 69, then returns to the valve 66 through the conduit 68 and is discharged through the outlet conduit 70.

The motor 69 causes, through its connection to the gears 38, the movement of the carriage 17 in the direction "B" (FIG. 2), thereby also moving the carrier 16 in the same direction. The gathering portion of the chain 10 is thus brought into contact with the upper layer of the packed silage. The layer of the silage is gathered or scraped towards the disintegrator 52, which also disintegrates that portion of the layer which is beyond the reach of the gathering run of the chain 10, i.e. the portion between the sprocket wheel 12 and the wall 30. The disintegrated silage is then blown by the blower 48 out of the silo via the duct 49.

It will be appreciated that, in the above embodiments, the gathering run portion of the chain engages the top layer of the silage from the front side. Inasmuch as the gathering or scraping capability of the chain depends on the instantaneous condition of the silage, it may occur that the advance of the carriage 17 is faster than the speed at which the chain can scrape all the silage. Such conditions will result in retardation of the carrier 16 with respect to the carriage 17. The retardation will cause the bars 35 to slightly incline as indicated in broken lines in FIG. 5, thereby pushing the actuator 54 of the switch in the switch box 53. The switch, in turn, will cause shifting of the solenoid control valve 62 to close its pressure conduit to the valve 64 and, at the same time, to open the return conduit 63, thereby stopping the motor 69. The elements of the carrier 16 are now operating with the carriage 17 stopped. The carrier 16 will eventually advance with regard to the stopped carriage 17, thereby releasing the switch in the switch box 53, as a consequence of which the solenoid valve 62 is shifted back to the position wherein the motor 69 is again driven to advance the carriage 17.

When the carriage 17 reaches the opposite end of the silo, the flow reverse valve 76 is actuated to reverse the hydraulic fluid flow in the motor 69, thereby causing the carriage 17 to return back to the starting position, wherein the flow control valve 64 is actuated to close the conduit 65 and thus to stop the motor 69. The carrier 16 is lowered in the above mentioned manner and the flow reverse valve 66 is subsequently reshifted to its first position for a forward drive of the carriage 17 and the whole operation cycle is repeated.

When the silo is empty, the carrier 16 can be lifted by the cables 46 after the locking pin 156, the nose 22 and the pawl 155 have been disengaged from their respective counterparts. The assembly of the tubular members 18, 19 can then expand by the action of the spring 20 as the carrier 16 moves upwards across the diverging side walls 27, 30.

It is to be noted that the foregoing disclosure deals with one embodiment of the present invention. There are many other embodiments which might differ from the above example. For instance, more than one motor 69 can be used in driving the carriage 17. The motors 80, 81 and 82 can be substituted by a single one. It is also possible to use an electric drive in place of the hydraulic one. However, these and many other modifications do not depart from the scope of the present invention as defined in the following claims.

The embodiments of the invention in which an exclusive property or privilege is claimed are defined as follows:

1. A bulk material unloader having a gathering chain adapted to train about a chain path, said chain path being of a constant length and including a gathering portion and a slack portion;
    said chain being further movable in a direction substantially perpendicular to said gathering run to bring the chain into operative engagement with said material;
    said unloader including means for selectively changing the length of said gathering run, and means for changing the length of said slack portion simultaneously with the changing of the length of said gathering run, said chain path being substantially triangular;
    said direction of the movement bringing the chain into an operative engagement with said material being substantially horizontal, said gathering run also extending in a substantially horizontal direction;
    means for selectively changing the position of said gathering run in vertical direction;
    the unloader being further provided with sprocket wheels mounted for rotation at ends of an extensible carrier means;
    said carrier means being provided with a device for locking the carrier means in a predetermined extended stage thereby fixing the sprocket wheels at a predetermined distance from each other until subsequent release of said locking device;
    said means for selectively changing the position of said gathering run in vertical direction including locking means for locking said gathering run in a selected height;
    said carrier means being adapted to be spring urged to extend in length in order to increase the distance between said sprocket wheels and thereby to increase the length of said gathering run;
    wherein said carrier means comprises two tubular members adapted to telescope one into the other thereby forming a tubular assembly with a spring arranged inside said tubular assembly, said spring being adapted to urge the tubular assembly to increase in length.

2. A silo unloader as claimed in claim 1, further provided with silo wall contacting means, arranged in proximity to said sprocket wheels and secured to the ends of said tubular assembly, each of said contacting means being adapted to rest against its adjacent silo wall and to maintain a distance between said wall and the chain passing over said sprocket wheel.

3. A silo unloader as claimed in claim 2 wherein said silo wall contacting means are casters.

4. A silo unloader as claimed in claim 2 further provided with a device for transporting silage from one end of said gathering run out from said silo.

5. A silo unloader as claimed in claim 4, wherein said device for transporting the silage includes a blower arranged at one end of a tubular duct, the opposite end of said duct terminating outside of said silo.

6. A silo unloader as claimed in claim 5 further provided with a disintegrator means arranged in proximity to said blower, whereby the silage can be disintegrated to facilitate its transport by said transporting device.

7. A silo unloader as claimed in claim 5, wherein the duct is extensible, whereby its operative height can be selectively changed.

8. A silo unloader as claimed in claim 5, wherein there are provided separate drive motors for at least one of said sprocket wheels and for said blower.

9. A silo unloader as claimed in claim 8, wherein said drive motors are hydraulic motors included in a hydraulic control circuit of said silo unloader.

10. A silo unloader as claimed in claim 5, wherein at least one of said carriage sprocket wheels, said blower and said carriage are each provided with a drive motor.

11. A silo unloader as claimed in claim 1, wherein said carrier means are connected to the lower ends of rods, the upper portions of said rods being swingably connected to said carriage for swingable movement, substantially in the direction along said silo, the upper portions of said rods being provided with releasable locking means for preventing said rods from moving upwardly from a predetermined upright position,
    the unloader being further provided with lifting means adapted to selectively change the vertical distance between said carriage and said carrier means, said lifting means comprising winding drums mounted for rotation in said carriage, said drums being provided with cables, said cable being wound on said drums, the lower ends of said cables being connected to said carrier means, said winding drums being provided with releasable locking means for preventing said drums from rotation, whereby the distance between said carrier and said carriage can be selectively fixed.

12. A silo unloader as claimed in claim 11, wherein at least one of said rods is provided with swing-sensing means operatively connected to drive means of said carriage to stop the advance of said carriage when said rod reaches a predetermined maximum angular deviation from a vertical position of said rod, whereby the movement of said carriage along said silo can be interrupted when the carrier means advance at a slower speed than that of said carriage.

13. A silo unloader as claimed in claim 11, wherein said angular deviation is of the type wherein said rod slopes downwardly and backwardly with regard to the forward movement of said carriage, said forward movement being that of bringing the chain into said operative engagement with the silage.

* * * * *